(12) United States Patent
Saleh et al.

(10) Patent No.: US 10,510,185 B2
(45) Date of Patent: Dec. 17, 2019

(54) VARIABLE RATE SHADING

(71) Applicant: Advanced Micro Devices, Inc., Sunnyvale, CA (US)

(72) Inventors: Skyler Jonathon Saleh, Sunnyvale, CA (US); Christopher J. Brennan, Boxborough, MA (US); Andrew S. Pomianowski, Sunnyvale, CA (US); Ruijin Wu, Sunnyvale, CA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 0 days.

(21) Appl. No.: 15/687,421

(22) Filed: Aug. 25, 2017

(65) Prior Publication Data

US 2019/0066371 A1    Feb. 28, 2019

(51) Int. Cl.
| | |
|---|---|
| *G06T 15/80* | (2011.01) |
| *G06T 15/40* | (2011.01) |
| *G06T 15/00* | (2011.01) |
| *G06T 11/40* | (2006.01) |

(52) U.S. Cl.
CPC .............. *G06T 15/80* (2013.01); *G06T 11/40* (2013.01); *G06T 15/005* (2013.01); *G06T 15/405* (2013.01)

(58) Field of Classification Search
CPC ....... G06T 15/506; G06T 15/50; G06T 15/60; G06T 15/80; G06T 15/06
See application file for complete search history.

(56) References Cited

U.S. PATENT DOCUMENTS

| | | | |
|---|---|---|---|
| 8,040,357 B1 * | 10/2011 | Hutchins | ................ G06T 11/40 345/606 |
| 8,044,956 B1 | 10/2011 | Kilgard | |
| 9,569,886 B2 | 2/2017 | Akenine-Moller et al. | |
| 10,147,227 B2 * | 12/2018 | Nevraev | ................ G06T 15/80 |
| 2009/0102843 A1 * | 4/2009 | Sloan | ................... G06T 15/503 345/426 |
| 2016/0110837 A1 * | 4/2016 | Sideris | ................... G06T 11/40 345/522 |
| 2017/0133283 A1 | 5/2017 | Kenworthy et al. | |
| 2017/0161940 A1 | 6/2017 | Liktor et al. | |
| 2017/0243395 A1 | 8/2017 | Vaidyanathan et al. | |
| 2017/0293995 A1 * | 10/2017 | Saleh | ........................ G06T 1/20 |
| 2018/0240268 A1 * | 8/2018 | Nevraev | ................ G06T 15/80 |

* cited by examiner

*Primary Examiner* — Todd Buttram
(74) *Attorney, Agent, or Firm* — Volpe and Koenig, P.C.

(57) ABSTRACT

A technique for performing rasterization and pixel shading with decoupled resolution is provided herein. The technique involves performing rasterization as normal to generate fine rasterization data and a set of (fine) quads. The quads are accumulated into a tile buffer and coarse quads are generated from the quads in the tile buffer based on a shading rate. The shading rate determines how many pixels of the fine quads are combined to generate coarse pixels of the coarse quads. Combination of fine pixels involves generating a single coarse pixel for each such fine pixel to be combined. The positions of the coarse pixels of the coarse quads are set based on the positions of the corresponding fine pixels. The coarse quads are shaded normally and the resulting shaded coarse quads are modified based on the fine rasterization data to generate shaded fine quads.

18 Claims, 7 Drawing Sheets

VARIABLE RATE SHADING

BACKGROUND

Three-dimensional ("3D") graphics processing pipelines perform a series of steps to convert input geometry into a two-dimensional ("2D") image for display on a screen. Some of the steps include rasterization and pixel shading. Rasterization involves identifying which pixels (or sub-pixel samples) are covered by triangles provided by stages of the pipeline prior to the rasterizer. The output of rasterization includes quads—a block of 2×2 pixels—and coverage data that indicates which samples are covered by the pixels of the quads. The pixel shader shades the pixels of the quads, and the pixels of the quads are then written to a frame buffer. Because pixel shading is very resource-intensive, techniques are constantly being developed to improve efficiency of pixel shading.

BRIEF DESCRIPTION OF THE DRAWINGS

A more detailed understanding can be had from the following description, given by way of example in conjunction with the accompanying drawings wherein.

DETAILED DESCRIPTION

A technique for performing rasterization and pixel shading with decoupled resolution is provided herein. The technique involves performing rasterization as normal to generate fine rasterization data and a set of (fine) quads. The quads are accumulated into a tile buffer and coarse quads are generated from the quads in the tile buffer based on a shading rate. The shading rate determines how many pixels of the fine quads are combined to generate coarse pixels of the coarse quads. Combination of fine pixels involves generating a single coarse pixel for each such fine pixel to be combined. Each coarse pixel has coverage data corresponding to the coverage of the corresponding fine pixels (i.e., the fine pixels combined to form the coarse pixel). If the combination of sample coverage data from fine pixels would exceed the number of bits assigned to coverage in a pixel, then some of the coverage data from the fine pixels are removed, leaving a reduced set of coverage data in the coarse pixel. The positions of the coarse pixels of the coarse quads are set based on the positions of the corresponding fine pixels. In one example, the position of each pixel of a coarse quad is set to a center point of the area of the render target covered by the corresponding fine pixels. The coarse quads are shaded normally and the resulting shaded coarse quads are modified based on the fine rasterization data to generate shaded fine quads. This modification involves upsampling (cloning) each pixel of the coarse quads to generate a number of upsampled cloned pixels each having the color of the corresponding coarse pixel and then applying the fine rasterization data to each upsampled cloned pixels.

Figure 1:
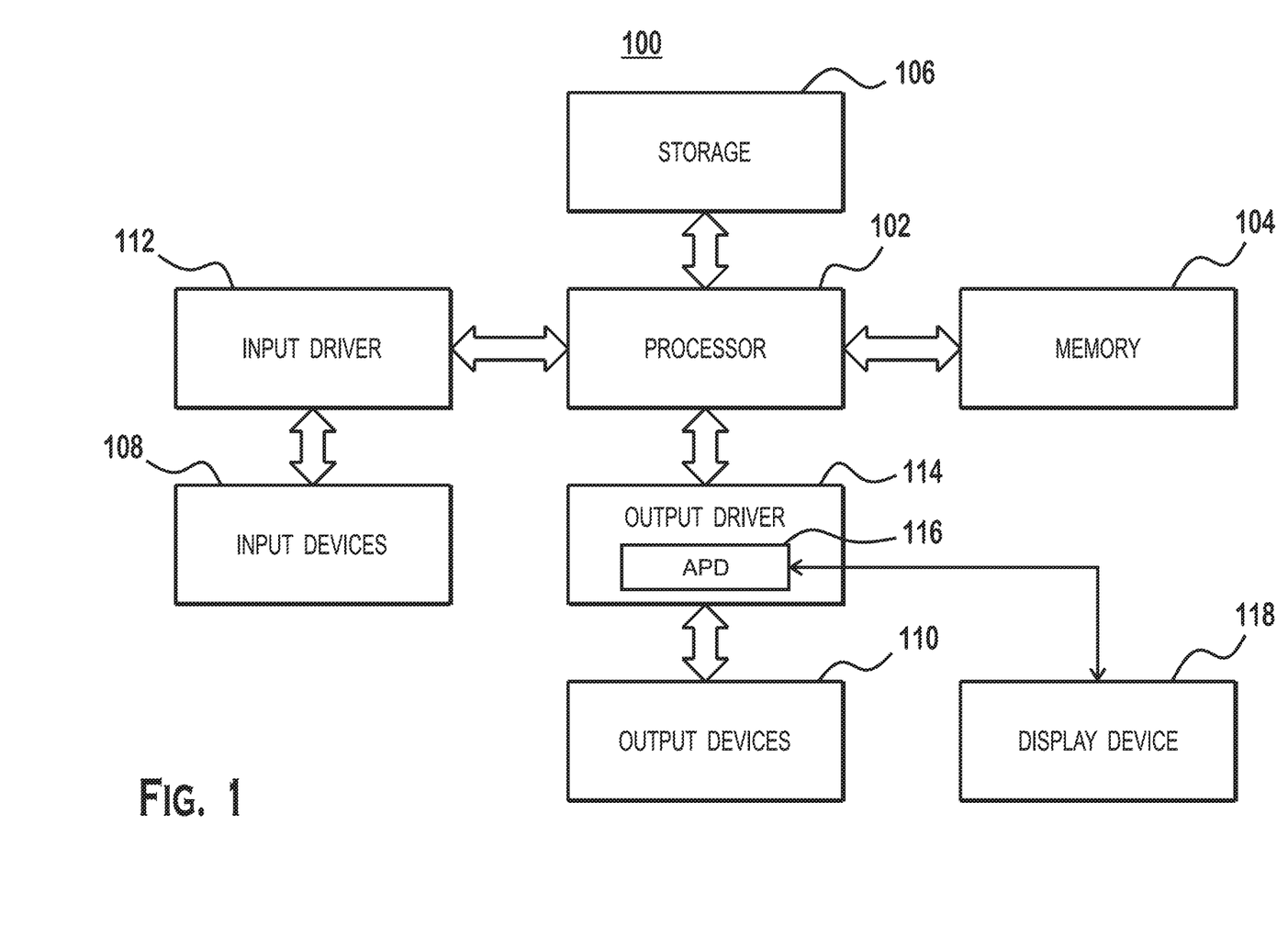
FIG. 1 is a block diagram of an example device in which one or more features of the disclosure can be implemented.

FIG. 1 is a block diagram of an example device 100 in which one or more features of the disclosure can be implemented. The device 100 could be one of, but is not limited to, for example, a computer, a gaming device, a handheld device, a set-top box, a television, a mobile phone, a tablet computer, or other computing device. The device 100 includes a processor 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices 114 (e.g., controlling operation, receiving inputs from, and providing data to output drivers 114). It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a display device 118, which, in some examples, is a physical display device or a simulated device that uses a remote display protocol to show output. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
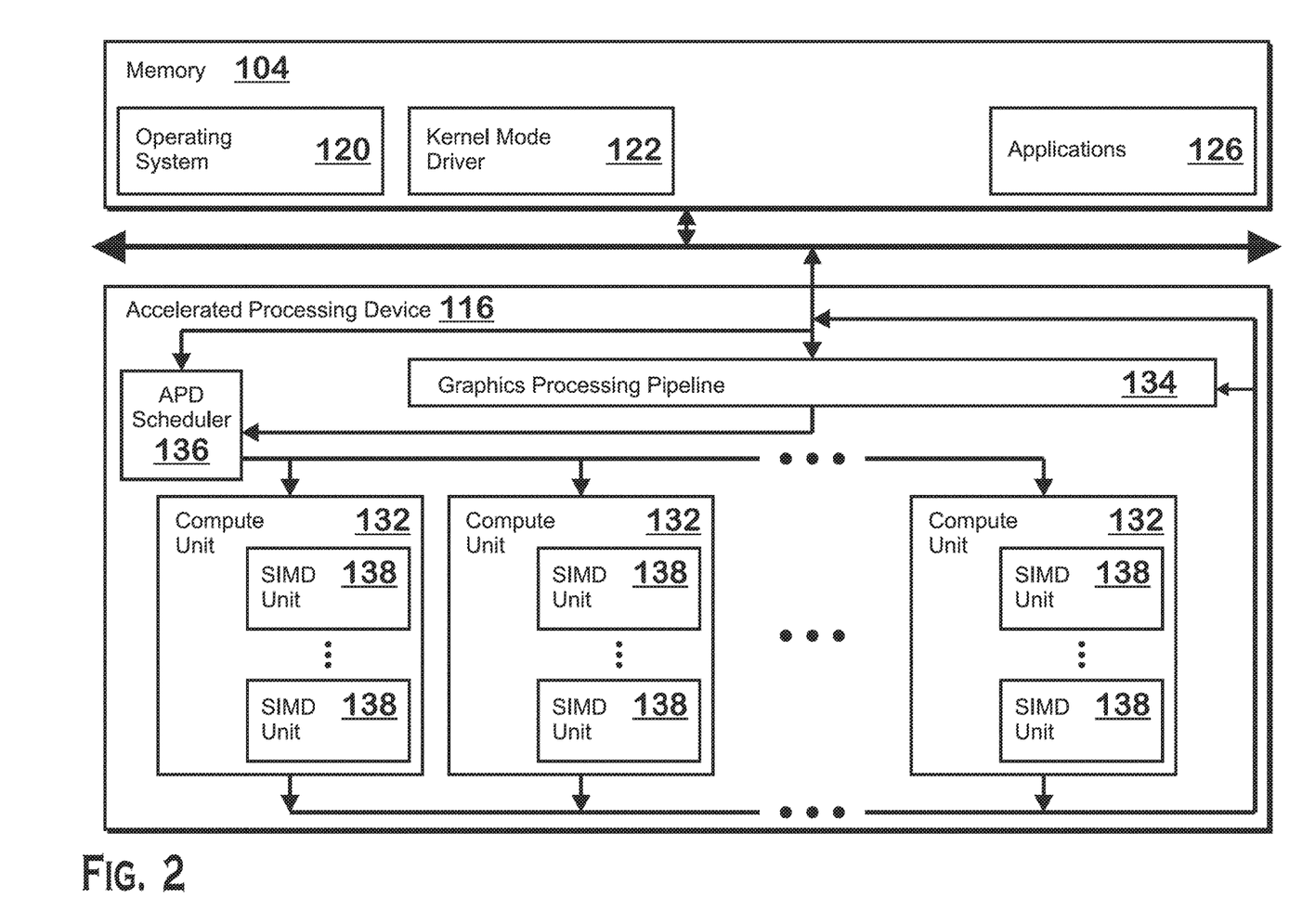
FIG. 2 illustrates details of the device of FIG. 1, according to an example.

FIG. 2 illustrates details of the device 100 and the APD 116, according to an example. The processor 102 (FIG. 1) executes an operating system 120, a driver 122, and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. An APD scheduler 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
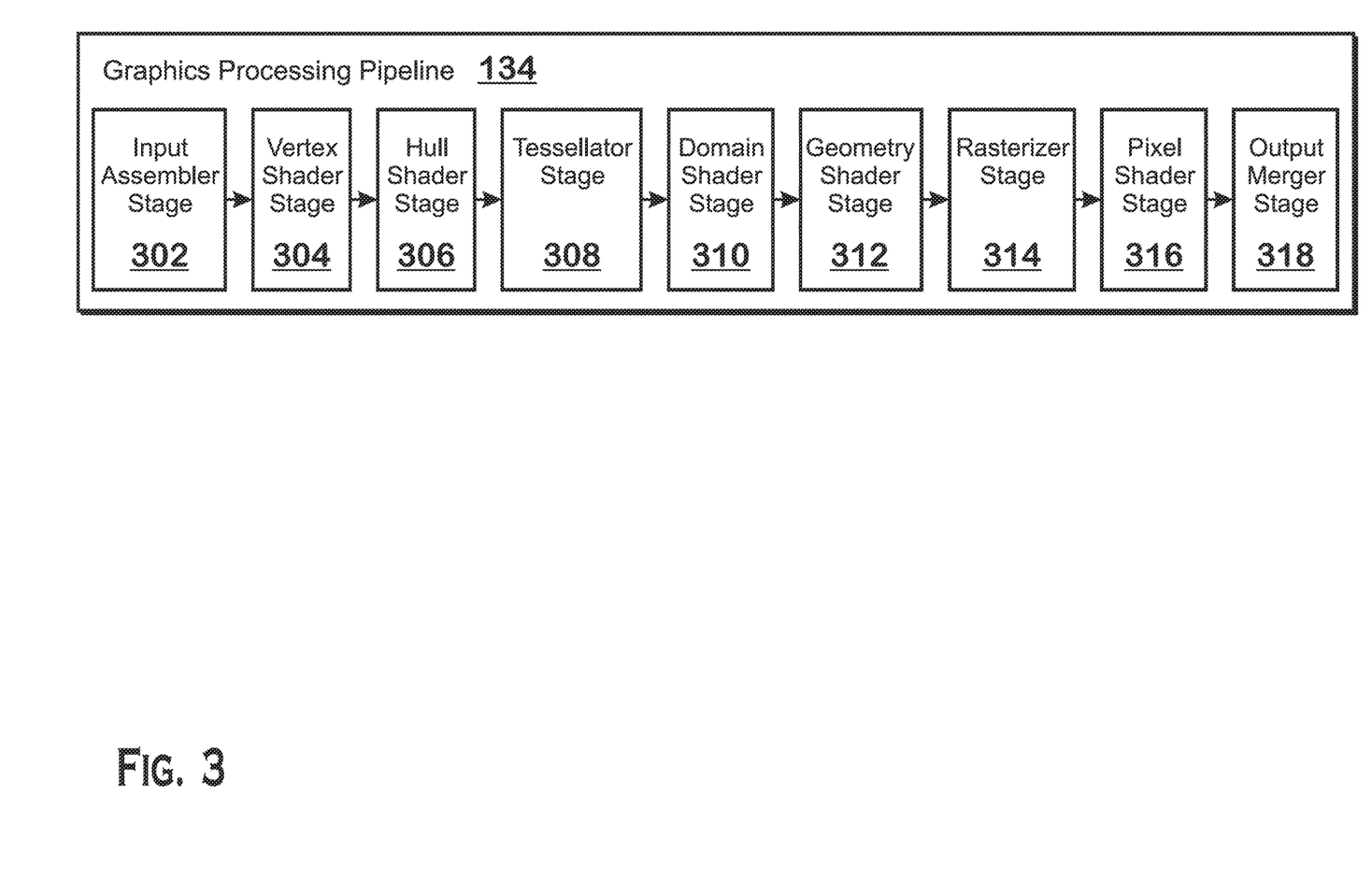
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132, that are compiled by the driver 122 as with the vertex shader stage 304.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. In some instances, a geometry shader program that is compiled by the driver 122 and that executes on the compute units 132 performs operations for the geometry shader stage 312.

The rasterizer stage 314 accepts and rasterizes simple primitives (triangles) generated upstream from the rasterizer stage 314. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a pixel shader program that is compiled by the driver 122 and that executes on the compute units 132.

The output merger stage 318 accepts output from the pixel shader stage 316 and merges those outputs into a frame buffer, performing operations such as z-testing and alpha blending to determine the final color for the screen pixels.

In one mode of operation, the rasterization performed by the rasterizer stage 314 is done at the same resolution as pixel shading performed by the pixel shader stage 316. By way of more detailed background than the description provided above, the rasterizer stage 314 accepts triangles from earlier stages and performs scan conversion on the triangles to generate fragments. The fragments are data for individual pixels of a render target and include information such as location, depth, and coverage data, and later, after the pixel shader stage, shading data such as colors. The render target is the destination image to which rendering is occurring (i.e., colors or other values are being written).

Typically, the fragments are grouped into quads, each quad including fragments corresponding to four neighboring pixel locations (that is, 2×2 fragments). Scan conversion of a triangle involves generating a fragment for each pixel location covered by the triangle. If the render target is a multi-sample image, then each pixel has multiple sample locations, each of which is tested for coverage. The fragment records coverage data for the samples within the pixel area that are covered by the triangle. The fragments that are generated by the rasterizer stage 314 are transmitted to the pixel shader stage 316, which determines color values for those fragments, and may determine other values as well.

Performing rasterization and pixel shading at the same resolution means that for each fragment generated by the rasterizer, the pixel shader 316 performs a calculation to determine a color for that fragment. In other words, the area of screen-space occupied by a pixel is the same area as the precision with which colors are determined. In one example, in the SIMD-based hardware of the compute units 132, each fragment generated by the rasterizer stage 314 is shaded by a different work-item. Thus, there is a one-to-one correspondence between generated fragments and work-items spawned to shade those fragments. Note that the rasterizer stage 314 typically performs depth testing, culling fragments occluded by previously-rendered fragments. Thus, there is a one-to-one correspondence between fragments that survive this depth culling and work-items spawned to color those surviving fragments. Another way to understand the mode of operation in which rasterization is performed at the same resolution as shading is that the resolution at which the edges of a triangle can be defined is equivalent to the resolution at which colors of that triangle can be defined.

One issue with the above mode of operation, in which rasterization occurs at the same resolution as pixel shading occurs for triangles that have a fixed color or low frequency change in color. For such triangles, pixel shading operations on nearby fragments produce the same or similar color and are effectively redundant. A similar result could therefore be performed with a much smaller number of pixel shader operations. Thus, it is advantageous to decouple the rasterization resolution from the shading resolution, and a technique for allowing rasterization to occur at a different resolution than pixel shading is provided below. The advantage of such a technique is a reduction in the number of pixel shader operations being performed, which reduces processing load and improves performance.

Figure 4:
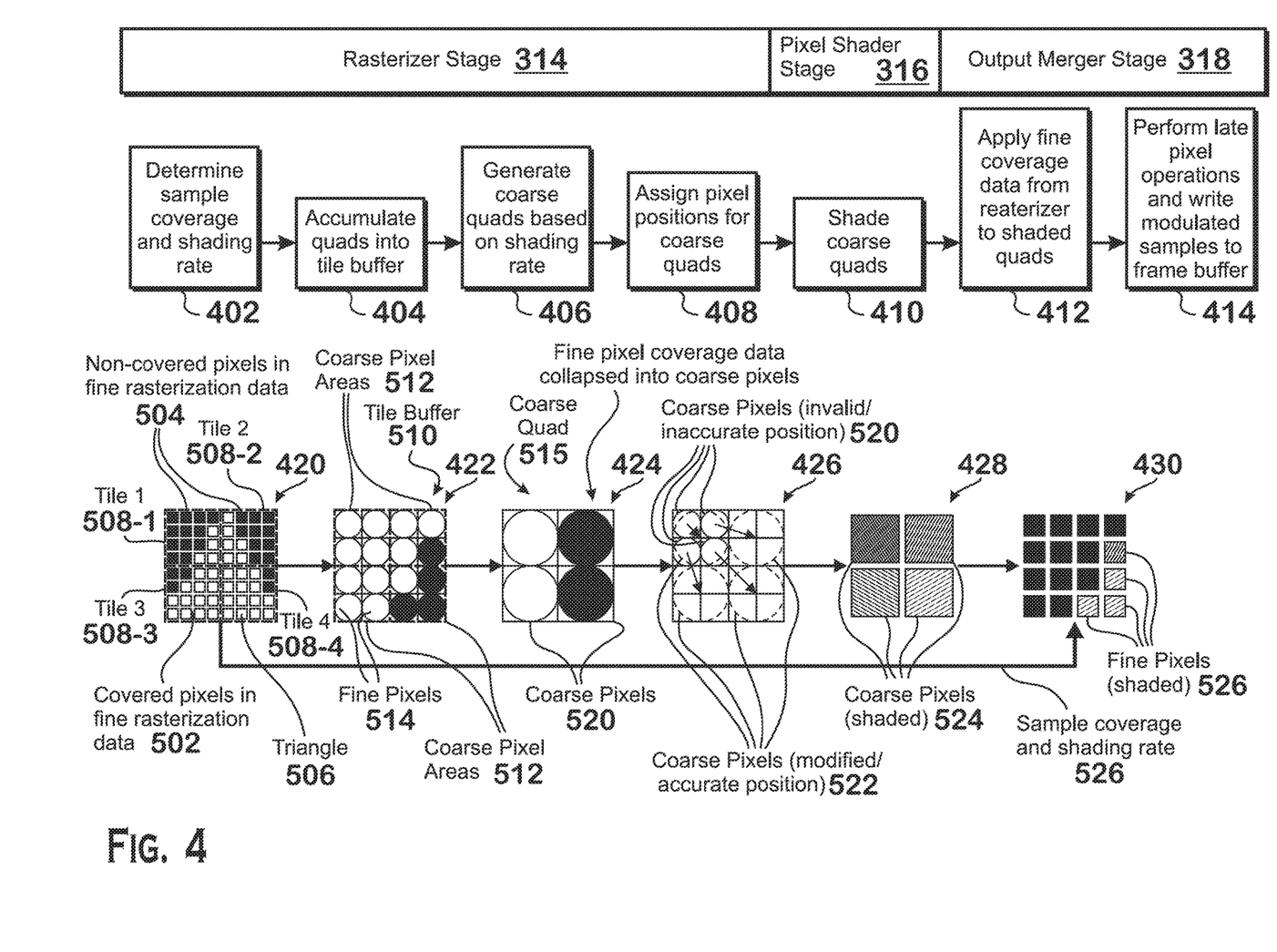
FIG. 4 illustrates a technique for performing rasterization at a different resolution than pixel shading, according to an example.

FIG. 4 illustrates a technique for performing rasterization at a different resolution than pixel shading, according to an example. FIG. 4 illustrates a set of steps, provides an example pictorial illustration of the different steps, and illustrates which stages of the graphics processing pipeline 134 are associated with which steps.

The technique begins with step 402, where the rasterizer stage 314 rasterizes a triangle received from an earlier stage of the graphics processing pipeline 134. This rasterization is done at the resolution of the render target. Rasterization involves determining the samples of the render target that are covered by the triangle. The rasterizer stage 314 also performs depth testing at step 402. In one example, depth testing involves examining the depth value for each sample covered by the triangle and comparing those depth values to a depth buffer that stores depth values for already-processed triangles. The depth value for a particular sample is compared to the depth value stored at the depth buffer for the same position as the particular sample. If the depth buffer indicates that the sample is occluded, then that sample is discarded and if the depth buffer indicates that the sample is not occluded, then that sample survives. In some depth test modes, a surviving sample causes an update to the depth buffer for the position of that sample. Depth testing may be performed in different modes, such as modes corresponding to various types of comparisons between the depth value in the depth buffer and the depth value of the sample at issue (e.g., a less-than comparison, a greater-than comparison, an equal-to comparison, or other types of comparisons) and various conditions for updating the depth buffer (e.g., a surviving sample may trigger an update, other conditions may trigger an update, or updates may be switched off). The data indicating which sample locations are covered and not occluded is passed on to other parts of the graphics processing pipeline 134 for later processing as described elsewhere in this description.

Other than the coverage data—also called fine rasterization data—the result of rasterization is quads. More specifically, for each pixel that has at least one sample covered by the triangle, the rasterizer stage 314 generates a fragment. The rasterizer 314 creates quads from these fragments. Quads include fragments for an adjacent section of 2×2 pixels, even if one or more such fragments are completely uncovered by the triangle (in which case such fragments are called "helper pixels"—which are used by the pixel shader to assist with generating colors for non-helper pixels but whose colors, as determined by the pixel shader, are not written to the frame buffer).

Also at step 402, the rasterizer stage 314 determines one or more shading rates for the samples of the triangle. A shading rate defines the number of pixels that are shaded together in the pixel shader stage 316. More specifically, a shading rate determines how many pixel locations in the render target are given the color determined by a single work-item in the pixel shader stage 316. For example, if the shading rate is one quarter, then a work-item in the pixel shader stage 316 determines a color for four pixel locations in the render target. Note, the color is said to be determined for pixel locations rather than pixels because colors for some pixels may be discarded due to being outside of the triangle or being occluded based on a depth test. For example, if the shading rate is one quarter and one particular work-item therefore determines a color for four pixel locations of the render target, and if three of those pixel locations are outside of a triangle or occluded, then the work-item actually determined a color for only one pixel. However, it is possible for all pixel locations for which a work-item determined a color to be within a triangle and not occluded. In such a situation, a single work-item determines a color for four different pixels.

Shading rates are applied to the render target based on one or more of the following techniques: a tile-based rate determination technique, in which the render target is divided into a set of shading rate tiles and each shading rate tile is assigned a particular shading rate; a triangle-based rate determination technique, in which a particular shading rate is assigned to each primitive; and a state-based rate determination technique, in which shading rate state changes propagate through the pipeline, and, at the rasterizer stage 314, set the shading rate for subsequent pixels until the next shading rate state change is processed by the rasterizer stage 314. These techniques may be combined, with different techniques being given different priorities. In one example, the state-based rate determination technique defines a default shading rate for samples of a triangle. In this example, the tile-based rate determination technique overrides the state-based values, and the triangle-based shading rates override the state-based values and the tile-based values. Other priorities may alternatively exist, or the different techniques may be independently applied.

A rasterization illustration 420 shows a triangle 506, including pixels that are covered (covered pixels 502) and pixels that are not covered by the triangle (non-covered pixels 504). The rasterization illustration 420 covers only a portion of a render target (not shown)—it should be understood that rasterization occurs for other portions of the render target not shown. The portion shown is divided into four different tiles 508. These tiles 508 are part of a mechanism by which pixels are "downsampled" to allow for a decoupling of the rasterization resolution from the pixel shading resolution, as described in more detail below. Note, tiles 508 are different from the shading rate tiles described above.

At step 404, the rasterizer stage 314 accumulates quads generated as the result of fine rasterization in step 402 into a tile buffer 510 as illustrated by the tile buffer illustration 422. The tile buffer 510 is a small memory that stores quads for a tile 508. In FIG. 4, the tile buffer 510 is the size of four 2-by-2-adjacent fine pixel quads, but in other examples, the tile buffer 510 may store a different number of quads. Fine pixels 514 are illustrated these correspond to pixels at the resolution of the render target, and not the down-sampled resolution. For quads that are depth-culled (i.e., no pixels survived the depth test in step 402), the corresponding portion of the tile buffer 510 remains empty. In addition, for quads that are not generated by the rasterizer stage 314 due to the corresponding portion of the screen not being covered by a triangle, the corresponding portion of the tile buffer 510 remains empty. The rasterizer stage 314 knows the order that quads are generated in, relative to screen position, and is thus able to determine when a quad is "missed."

At step 406, the rasterizer stage generates coarse quads 515 based on the shading rate (as illustrated in coarse quad illustration 424). The tile buffer can be thought of as including multiple coarse pixel areas 512. The size of a coarse pixel area 512 is dependent on the shading rate. More specifically, each coarse pixel area 512 includes a number of pixels equal to the reciprocal of the shading rate. For example, if the shading rate is ¼, then each coarse pixel area 512 includes 4 fine pixels 514. If the shading rate is ½, then each coarse pixel area 512 includes 2 fine pixels 514, and so on.

One or more coarse quads 515 is generated based on the size of the tile buffer 510 and the shading rate. The number of coarse quads 515 generated is equal to the size of the tile buffer 510 in fine pixels 514, divided by four (four pixels in a quad), and multiplied by the shading rate. Thus if the tile buffer 510 is sixteen pixels 16, as in the example of FIG. 4, and the shading rate is one quarter, then the number of coarse quads 515 generated is equal to 16/4*(¼)=1. For a similar tile buffer 510 and a shading rate of ½, 2 coarse quads are generated 515, and so on.

Each coarse quad 515 includes four coarse pixels 520. The coverage assigned to any particular coarse pixel 520 is the amalgamation of the coverage assigned to the fine pixels 514 that are "collapsed" into that coarse pixel 520. In some situations, such an amalgamation would result in a coarse pixel 520 having too much coverage data. More specifically, the graphics processing pipeline 134 may have a limitation on the number of bits that can be used to specify coverage data for a pixel. In this situation, when coverage data from fine pixels 514 is amalgamated into coverage data for a coarse pixel 520, that data is reduced in fidelity. The coverage data that remains would be geometrically representative of the coverage of the individual fine pixels. This idea will be discussed in greater detail with respect to FIG. 6. If a coarse quad 515 would be generated that has no coverage, then no such coarse quad 515 is generated. If the tile buffer 510 has not received any quads for a particular tile 508 of a render target, then the rasterizer stage 314 determines that no triangles exist that cover that tile 508 or that any quads generated for that tile 508 are occluded by other geometry. In that case, no coarse quads 515 are generated for that tile 508.

At step 408, the rasterizer stage 314 sets the positions of the coarse pixels 520 of the coarse quads 515 generated at step 406 (as illustrated in illustration 426). The positions are geometrically representative of the coarse pixel areas 512 that included the fine pixels 514 that were collapsed into the coarse pixels 520. In one example, the positions of the coarse pixels 520 are set to the center of the corresponding coarse pixel areas 512. Any other technically feasible technique for setting the position of the coarse pixels 520 would be possible.

At step 410, the pixel shader stage 316 shades the generated coarse quads 515 to generate shaded coarse pixels 524 as illustrated in pixel shading illustration 524. This shading is done in a standard way—for example, each coarse pixel 520 launches as a work-item which is processed in the SIMD hardware.

At step 412, the output merger stage 318 applies the fine coverage data determined at step 412 to the shaded coarse pixels 524 as illustrated in modulation illustration 526. Specifically, each shaded coarse pixel 524 is cloned based on the shading rate, with each clone getting the color of the shaded coarse pixel 524, to generate shaded fine pixels 526. Coverage is applied to each shaded fine pixel 526 based on the data in the sample coverage generated by the rasterizer stage 314. If a sample is not covered in that data, then that sample is negated in the corresponding cloned fine pixel. A cloned pixel that has no coverage in the data generated by the rasterizer stage 314 is likewise set to have no pixel coverage. The operations involved in step 412 may be referred to as "modulation" here. For example, it may be said that the shaded coarse pixels 524 are modulated by the coverage data generated by the rasterization stage 314 to generate the shaded fine pixels 526.

At step 414, the shaded fine pixels 526, having coverage modified by the sample coverage from the rasterizer stage 314, are written to the render target. Other late pixel operations may be applied as well, such as late z operations, blending, or the like.

Figure 5:
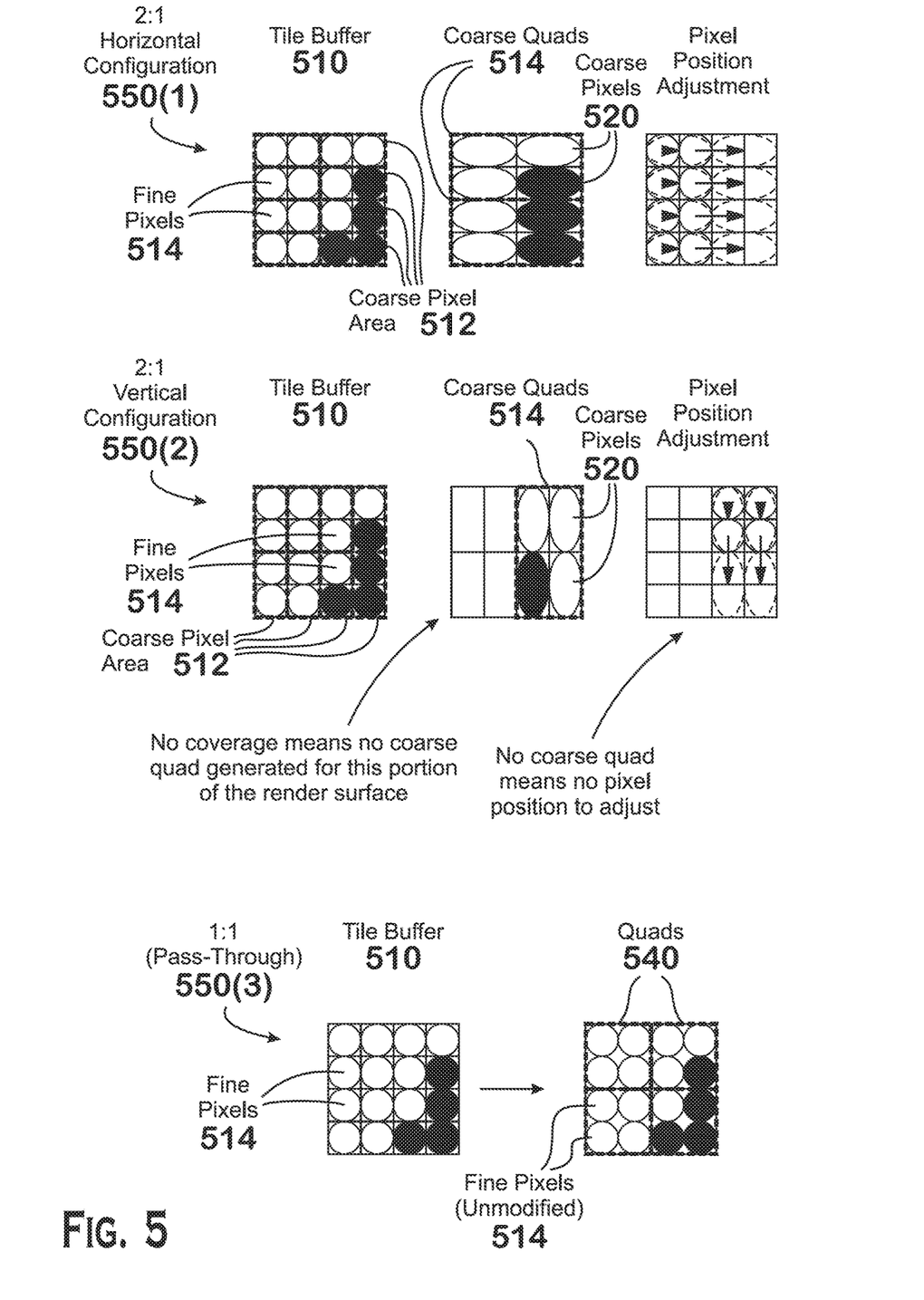
FIG. 5 illustrates coarse quad generation for shading rates other than one quarter, according to some examples.

FIG. 5 illustrates the tile buffer 510, and coarse quad generation from the contents of the tile buffer 510, for shading rates other than one quarter, according to some examples. Specifically, a 2:1 horizontal configuration 550 (1), a 2:1 vertical configuration 550(2), and a 1:1 pass-through configuration 550(3) are shown.

The 2:1 horizontal configuration 550(1) has a one half shading rate in which two horizontally neighboring fine pixels 514 are combined into coarse pixels 520. Similarly, the 2:1 vertical configuration 550(2) has a one half shading rate in which two vertically neighboring fine pixels 514 are combined into coarse pixels 520. For both of the illustrated 2:1 configurations, as with the one quarter shading rate, four coarse pixels 520 are included within each coarse quad 514. Because the tile buffer 510 corresponds to eight coarse pixels 520, two quads are generated. Additionally, each coarse pixel 520 is assigned the coverage of the fine pixels 514 that are accumulated into the coarse pixel 520, with coverage fidelity being reduced if the coarse pixels 520 do not include enough bits to store all coverage data for the fine pixels 514. Pixel position adjustment involves setting the position of each coarse pixels 520 to a position that is geometrically representative of the coarse pixel areas 512. In one example, this position is a center of the coarse pixel areas 512. Other technically feasible techniques for setting the pixel positions for the coarse pixels 520 are possible as well. In the 1:1 configuration 550(3), no special actions are performed. There are no coarse quads—the quads 540 generated by rasterization are output without modification to be shaded by the pixel shader stage 316.

Figure 6:
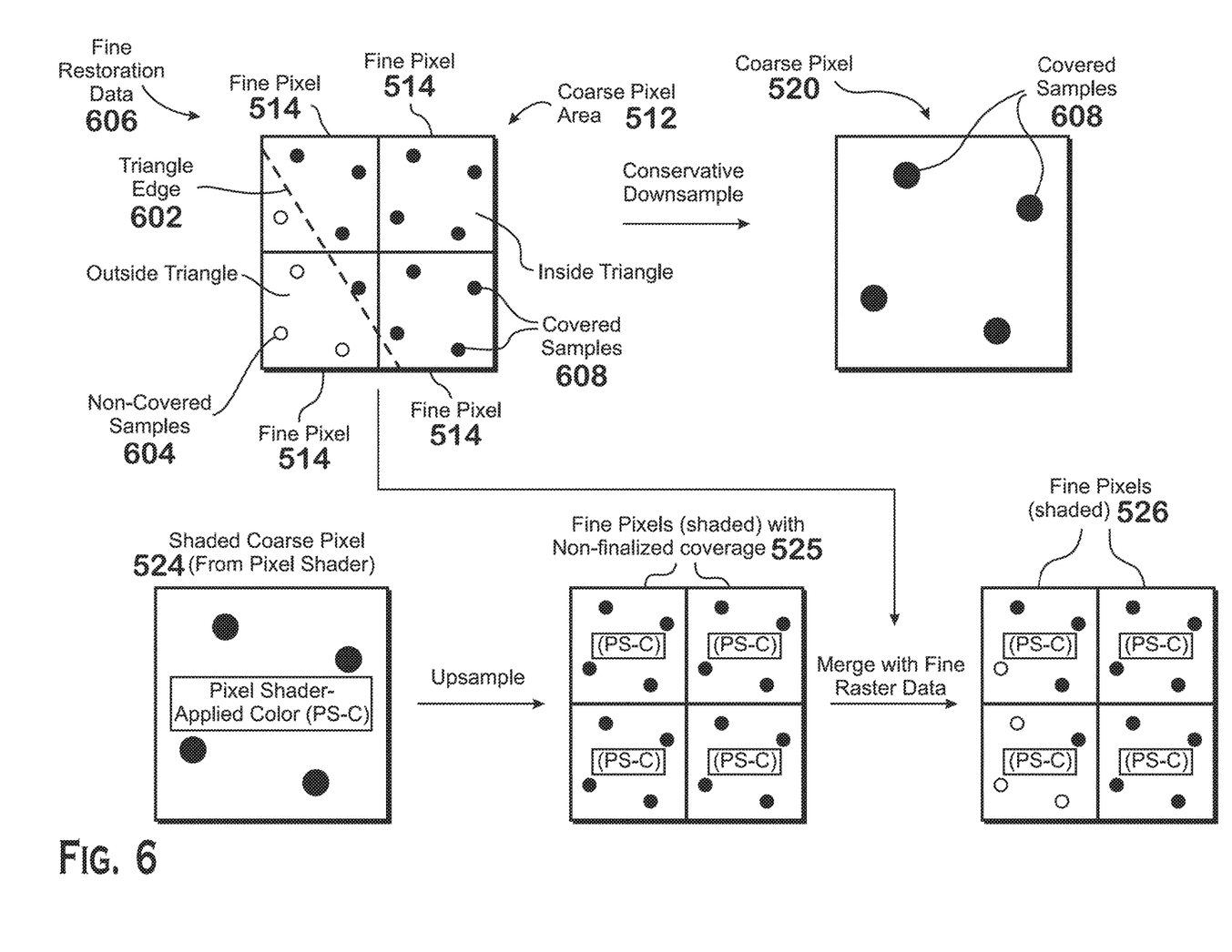
FIG. 6 illustrates some details of the technique illustrated in FIG. 4, including details related to rendering to a multi-sample render target.

FIG. 6 illustrates some details of the technique illustrated in FIG. 4, including details related to rendering to a multi-sample render target, according to an example. FIG. 6 illustrates some of the steps of FIG. 4, with others omitted for brevity.

Fine rasterization data 606 includes the rasterization data generated by the rasterizer stage 314 at step 402, for a multi-sample render target. A multi-sample render target is a render target in which each pixel has multiple samples of coverage. In FIG. 6, only a single coarse pixel area 512 is illustrated for brevity. Further, the shading rate is one quarter, though this shading rate is used as an example only. A one quarter shading rate means that the coarse pixel area 512 includes four fine pixels 514.

The fine rasterization data 606 illustrates several covered samples 608, which are inside a triangle (as defined by a triangle edge 602) and several non-covered samples 604, which are outside of the triangle. The "conservative downsample" operation corresponds to step 406 of FIG. 4. Specifically, the conservative downsample operation illustrates the collapse of multiple fine pixels 514 into a single coarse pixel 520, along with a reduction in sample coverage data due to the limitation in sample coverage data available to each pixel. As described above, this collapse involves retaining a set of sample coverage that is geometrically representative of the higher fidelity sample coverage of the fine pixels 514. In FIG. 6, each sample corresponds to a different fine pixel 514. The downsample is conservative in that if a fine pixel 514 has any samples that are covered, then the sample of the coarse pixel 520 that corresponds to that fine pixel 514 is considered covered. Note that there does not need to be only one sample in the coarse pixel 620 per fine pixel 514. Multiple samples in the coarse pixel 520 may correspond to a single fine pixel 514. In that situation, each sample in the coarse pixel 520 would be geometrically representative of the corresponding samples in the fine pixels 514.

At the bottom left, the coarse pixel 520 is shown after processing by the pixel shader, as a shaded coarse pixel 520. This shaded coarse pixel 524 is colored with a color that is labeled the "pixel shader-applied color," shortened to "(PS-C)." This shaded coarse pixel 524 corresponds to the output of step 410 in FIG. 4. After this operation, the shaded coarse pixel 524 is up-sampled, based on the shading rate. More specifically, the shaded coarse pixel 524 is cloned to a number of fine pixels equal to the reciprocal of the shading rate (e.g., 4 in FIG. 6). Each fine pixel is assigned the color of the shaded coarse pixel 524. The number of samples in each such fine pixel is equal to the number of samples of the fine pixels 514 prior to generating the coarse quads. All of the samples of each cloned fine pixel are set in a binary manner—if the corresponding sample in the shaded coarse pixel 524 is covered, then all samples in the corresponding fine pixel are covered and if the corresponding sample in the shaded coarse pixel 524 is not covered, then all samples in the corresponding fine pixel are not covered. Finally, these fine samples are merged with the fine rasterization data 606. Merging consists of applying an "AND" to the samples of the shaded fine pixels with non-finalized coverage 525 and the corresponding samples of the fine rasterization data 606. A sample in the shaded fine pixels is considered coverage if the corresponding sample in the shaded fine pixels with non-finalized coverage 525 and the corresponding sample in the fine rasterization data 606 are both covered. If either or both are not covered, then the sample in the shaded fine pixel 526 is not covered.

Figure 7:
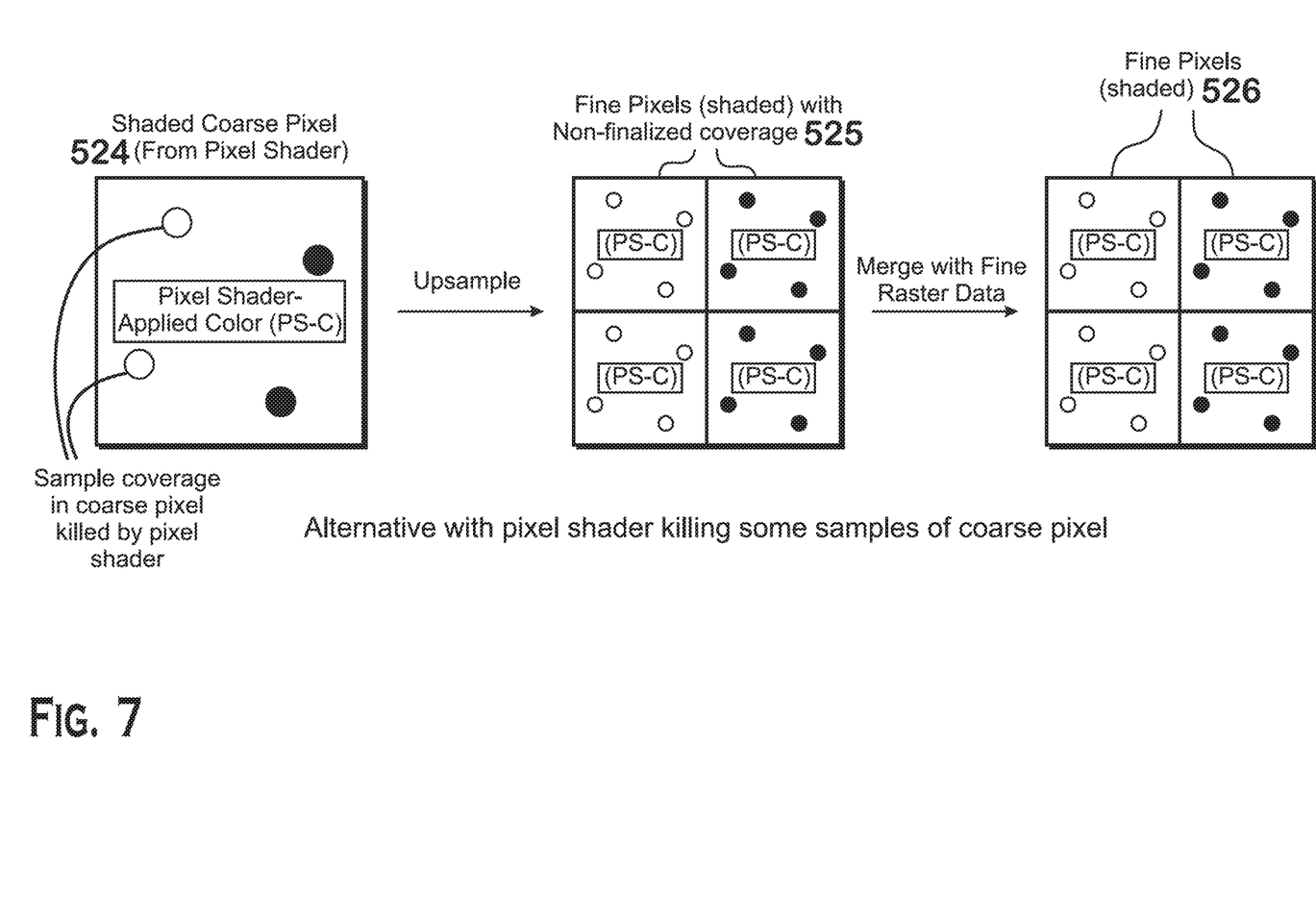
FIG. 7 illustrates an alternative technique to the example technique of FIG. 6, with some sample coverage in the shaded coarse pixel killed by the pixel shader.

FIG. 7 illustrates an alternative example to FIG. 6, with some sample coverage in the shaded coarse pixel 524 killed by the pixel shader. It is possible for the pixel shader stage 316 to modify or set coverage for quads being shaded. If the pixel shader stage 316 kills samples (e.g., sets those samples to be uncovered) of the coarse quads, then even though corresponding samples of the fine rasterization data 606 are considered covered, the corresponding samples of shaded fine pixels 526 output from step 412 will be uncovered. The example of FIG. 7 uses the same fine rasterization data 606 illustrated in FIG. 6. Thus, in FIG. 7, even though that fine rasterization data 606 indicates that some of the samples in the left two fine pixels 514 are covered, because the pixel shader stage 316 has killed corresponding samples of the shaded coarse pixels 524, no samples of the left two fine pixels 516 are considered covered.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for processing three-dimensional graphics with decoupled rasterization and pixel shading resolutions, to render an image to a render target, the method comprising:
rasterizing, via a rasterizer, a triangle to produce fine rasterization data and a set of one or more quads;
accumulating at least one of the set of one or more quads output by the rasterizer into a tile buffer having a tile buffer size;
downsampling quads in the tile buffer to generate coarse quads, the downsampling based on a shading rate defined for the at least one of the set of one or more quads, wherein the shading rate indicates a first number of quads to generate from a second number of quads that fit into the tile buffer size;
shading the coarse quads to generate shaded coarse quads; and
modulating the shaded coarse quads with the fine rasterization data.

2. The method of claim 1, wherein the tile buffer comprises a memory having sufficient capacity to store data for two or more quads of the set of one or more quads.

3. The method of claim 1, further comprising:
performing a depth test on the fine rasterization data to remove occluded pixels from the one or more quads.

4. The method of claim 1, wherein accumulating at least one of the set of one or more quads into the tile buffer comprises:
filling the tile buffer with quads of the set of one or more quads that correspond to a tile of a render target, wherein the portion of the tile buffer corresponding to quads that are not covered by the triangle or that are depth culled are not filled with any quads.

5. The method of claim 1, further comprising:
determining the shading rate.

6. The method of claim 5, wherein downsampling the quads in the tile buffer comprises:
generating, based on the shading rate, a set of one or more coarse quads that each includes coarse pixels generated from pixels of the quads in the tile buffer.

7. The method of claim 6, wherein each coarse pixel corresponds to an area of the render target that corresponds to a number of pixels of the set of one or more quads, the number being based on the shading rate.

8. The method of claim 6, wherein:
the render target is a multi-sampled render target; and
each coarse pixel includes multi-sample coverage associated with the corresponding pixels of the set of one or more quads.

9. An accelerated processing device ("APD") for processing three-dimensional graphics with decoupled rasterization and pixel shading resolutions, to render an image to a render target, the APD comprising:
a rasterizer stage configured to:
rasterize a triangle to produce fine rasterization data and a set of one or more quads,
accumulate at least one of the set of one or more quads output by the rasterizer into a tile buffer having a tile buffer size, and
downsample quads in the tile buffer to generate coarse quads, the downsampling based on a shading rate defined for the at least one of the set of one or more quads, wherein the shading rate indicates a first number of quads to generate from a second number of quads that fit into the tile buffer size;
a pixel shader stage configured to shade the coarse quads to generate shaded coarse quads; and
an output merger stage configured to modulate the shaded coarse quads with the fine rasterization data.

10. The APD of claim 9, wherein the tile buffer comprises a memory having sufficient capacity to store data for two or more quads of the set of one or more quads.

11. The APD of claim 9, wherein the rasterizer stage is further configured to:
perform a depth test on the fine rasterization data to remove occluded pixels from the one or more quads.

12. The APD of claim 9, wherein the rasterizer stage is configured to accumulate the at least one of the set of one or more quads into the tile buffer by:

filling the tile buffer with quads of the set of one or more quads that correspond to a tile of a render target, wherein the portion of the tile buffer corresponding to quads that are not covered by the triangle or that are depth culled are not filled with any quads.

13. The APD of claim 9, wherein the rasterizer stage is further configured to determine the shading rate.

14. The APD of claim 13, wherein the rasterizer is configured to downsample the quads in the tile buffer by:
generating, based on the shading rate, a set of one or more coarse quads that each includes coarse pixels generated from pixels of the quads in the tile buffer.

15. The APD of claim 14, wherein each coarse pixel corresponds to an area of the render target that corresponds to a number of pixels of the set of one or more quads, the number being based on the shading rate.

16. The APD of claim 13, wherein:
the render target is a multi-sampled render target; and
each coarse pixel includes multi-sample coverage associated with the corresponding pixels of the set of one or more quads.

17. A device comprising:
a processor; and
an accelerated processing device ("APD") for processing commands received from the processor with decoupled rasterization and pixel shading resolutions, to render an image to a render target, the APD comprising:
a rasterizer stage configured to:
rasterize a triangle to produce fine rasterization data and a set of one or more quads,
accumulate at least one of the set of one or more quads into a tile buffer having a tile buffer size, and
downsample quads in the tile buffer to generate coarse quads, the downsampling based on a shading rate defined for the at least one of the set of one or more quads, wherein the shading rate indicates a first number of quads to generate from a second number of quads that fit into the tile buffer size;
a pixel shader stage configured to shade the coarse quads to generate shaded coarse quads; and
an output merger stage configured to modulate the shaded coarse quads with the fine rasterization data.

18. The device of claim 17, wherein the tile buffer comprises a memory having sufficient capacity to store data for two or more quads of the set of one or more quads.

* * * * *